US011456989B2

(12) United States Patent
Bagwell

(10) Patent No.: US 11,456,989 B2
(45) Date of Patent: Sep. 27, 2022

(54) SYSTEMS AND METHODS FOR VIRTUALIZED NETWORK FUNCTION ("VNF") SELECTION IN A WIRELESS TELECOMMUNICATIONS NETWORK

(71) Applicant: Verizon Patent and Licensing Inc., Arlington, VA (US)

(72) Inventor: Myron Eugene Bagwell, Southlake, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/825,373

(22) Filed: Mar. 20, 2020

(65) Prior Publication Data
US 2021/0297383 A1 Sep. 23, 2021

(51) Int. Cl.
*G06F 15/16* (2006.01)
*H04L 61/4511* (2022.01)
(Continued)

(52) U.S. Cl.
CPC ......... *H04L 61/4511* (2022.05); *H04L 43/08* (2013.01); *H04L 61/103* (2013.01);
(Continued)

(58) Field of Classification Search
CPC .. H04W 8/26; H04L 63/0272; H04L 61/2007; H04L 61/103; H04L 43/08;
(Continued)

(56) References Cited

U.S. PATENT DOCUMENTS 7,609,641 B2 * 10/2009 Strutt .................... H04W 40/22
370/238
10,177,982 B2 * 1/2019 Yu ........................ H04L 12/4641
(Continued)

FOREIGN PATENT DOCUMENTS

EP 1950637 A1 * 7/2008 ............. G05B 19/19
WO WO-2017050343 A1 * 3/2017 ......... H04L 41/0803
(Continued)

OTHER PUBLICATIONS

Delay Sensitive Virtual Network Function Placement and Routing Racha Gouareb;Vasilis Friderikos;A. Hamid Aghvami 2018 25th International Conference on Telecommunications (ICT) (Year: 2018).*
(Continued)

*Primary Examiner* — Younes Naji
*Assistant Examiner* — Oluwatosin M Gidado

(57) ABSTRACT

A system described herein may provide a technique for the resolution of requests for Internet Protocol ("IP") addresses for Virtualized Network Functions ("VNFs") in a network, such as a Software-Defined Network ("SDN") (e.g., a wireless telecommunications network). In the network, different instances of the same VNF may be implemented by different hardware resources, and may accordingly have different IP addresses. Metrics of routes between instances of a requested VNF type and a requestor may be calculated, and a particular instance of the requested VNF may be selected based on the metrics (e.g., a lowest cost, highest performance, etc.). The IP address of the particular VNF instance may be provided to the requestor. The requestor, such as a User Equipment ("UE"), may communicate with the particular VNF instance in order to receive services provided the requested VNF type.

20 Claims, 9 Drawing Sheets

(51) Int. Cl.
*H04W 8/26* (2009.01)
*H04L 9/40* (2022.01)
*H04L 43/08* (2022.01)
*H04L 61/103* (2022.01)
*H04L 61/5007* (2022.01)

(52) U.S. Cl.
CPC ...... *H04L 61/5007* (2022.05); *H04L 63/0272* (2013.01); *H04W 8/26* (2013.01)

(58) Field of Classification Search
CPC ... H04L 61/1511; H04L 63/1408; H04L 9/14; H04L 41/0668; H04L 45/46; H04L 49/253; H04L 12/5692; H04L 47/10; G06F 9/5077
USPC .......................................................... 709/223
See application file for complete search history.

(56) References Cited

U.S. PATENT DOCUMENTS

| | | | | |
|---|---|---|---|---|
| 2018/0115485 | A1* | 4/2018 | Chiba | H04L 45/64 |
| 2019/0014005 | A1* | 1/2019 | Lessmann | H04W 64/003 |
| 2019/0342187 | A1* | 11/2019 | Zavesky | H04L 41/5009 |
| 2020/0244546 | A1* | 7/2020 | Tidemann | H04L 41/22 |
| 2020/0336554 | A1* | 10/2020 | Deshpande | H04L 67/51 |
| 2020/0396132 | A1* | 12/2020 | Wang | H04L 41/0853 |

FOREIGN PATENT DOCUMENTS

| | | | | |
|---|---|---|---|---|
| WO | WO-2019223855 | A1 * | 11/2019 | ......... H04L 41/5051 |
| WO | WO-2020020474 | A1 * | 1/2020 | .......... H04L 61/1511 |

OTHER PUBLICATIONS

Cost-efficient resource scheduling under QoS constraints for geo-distributed data centers Mirza Mohd Shahriar Maswood;Robayet Nasim;Andreas J. Kassler;Deep Medhi NOMS 2018—2018 IEEE/IFIP Network Operations and Management Symposium Year: 2018 | Conference Paper | Publisher: IEEE (Year: 2018).*

Approaches for adaptive optimization of routes in a distributed software-defined infrastructure of a virtual data center Irina P. Bolodurina;Denis I. Parfenov 2018 IEEE Conference of Russian Young Researchers in Electrical and Electronic Engineering (EIConRus) Year: 2018 | Conference Paper | Publisher (Year: 2018).*

3GPP TS 23.502 V16.3.0 (Dec. 2019), "3rd Generation Partnership Project; Technical Specification Group Services and System Aspects; Procedures for the 5G System (5GS); Stage 2 (Release 16)," Dec. 2019, p. 85.

ETSI TS 129 510 V15.1.0 (Oct. 2018), "5G; 5G System; Network function repository services; Stage 3 (3GPP TS 29.510 version 15.1.0 Release 15)," Oct. 2018.

* cited by examiner

US 11,456,989 B2

SYSTEMS AND METHODS FOR VIRTUALIZED NETWORK FUNCTION ("VNF") SELECTION IN A WIRELESS TELECOMMUNICATIONS NETWORK

BACKGROUND

A wireless telecommunications network may include Virtualized Network Functions ("VNFs") to implement various functions of the wireless telecommunications network. For example, a Fifth Generation ("5G") core network may utilize VNFs to implement Access and Mobility Management Functions ("AMFs"), Session Management Functions ("SMFs"), User Plane Functions ("UPFs"), or other functions. These VNFs may be implemented on geographically distinct hardware. For example, one data center in one region may implement a first set of UPFs, while another data center in another region may implement a second set of UPFs.

DETAILED DESCRIPTION OF THE PREFERRED EMBODIMENTS

The following detailed description refers to the accompanying drawings. The same reference numbers in different drawings may identify the same or similar elements.

Embodiments described herein provide for the selection of a set of a particular VNF to provide services (e.g., services associated with a wireless telecommunications network, such as voice call services, messaging services, etc.) to a UE, in a manner that provides optimal performance and/or lowest resource cost. Such a network may sometimes be referred to as a Software-Defined Network ("SDN"). For example, as described herein, VNFs may be assigned in a manner that minimizes latency associated with communications between the UE and the selected VNFs, and/or consumes a reduced amount of network resources when compared to other implementations.

Figure 1:
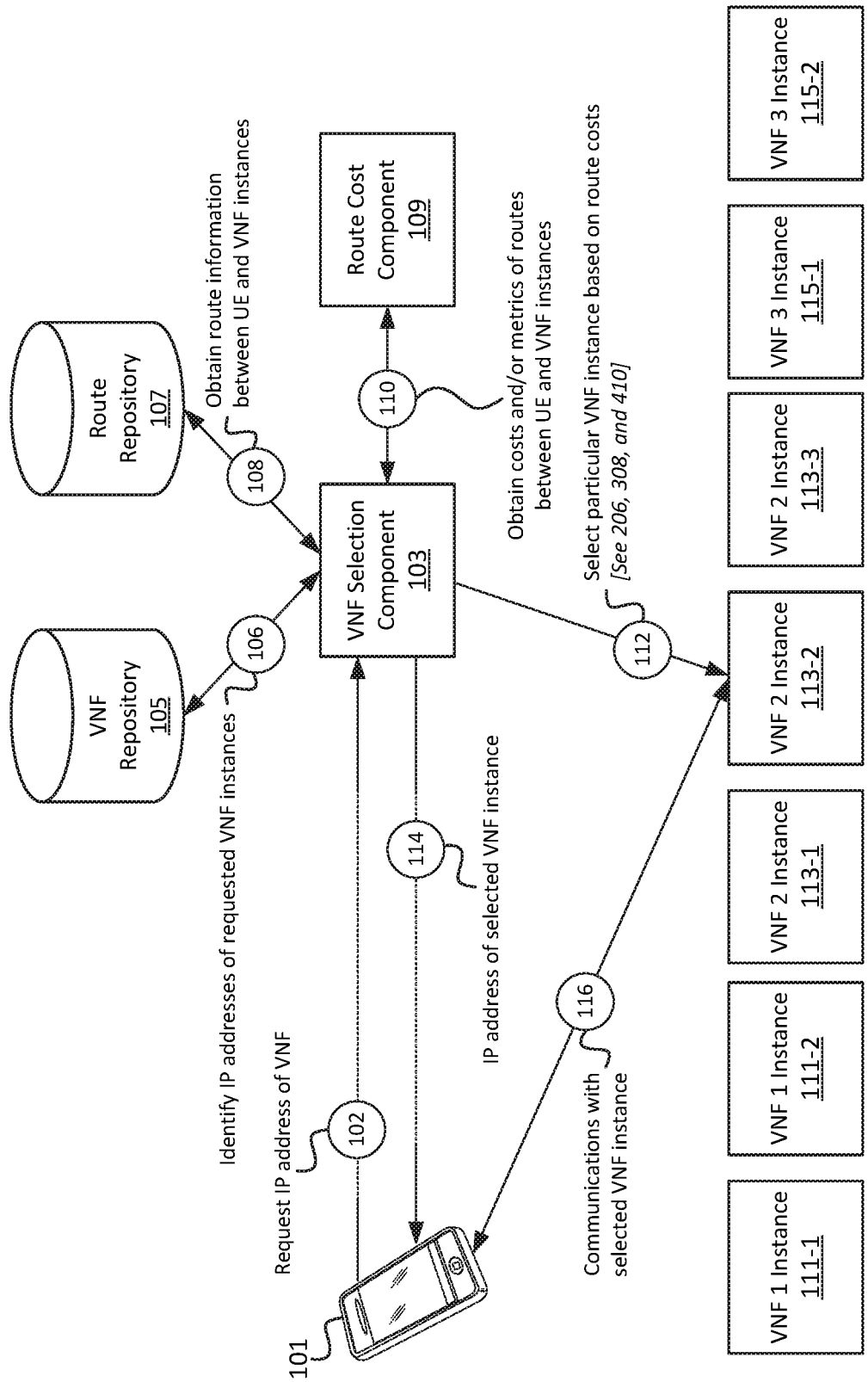
FIG. 1 illustrates a selection of a particular VNF instance based on route costs between VNF instances and a requesting User Equipment ("UE"), in accordance with some embodiments.

As shown in FIG. 1, UE 101 may output (at 102) a request for an IP address of a particular VNF. For example, this request may, may include, or may be part of, an attachment of UE 101 to a wireless network, a handover of UE 101 to the wireless network from another wireless network, an initial session establishment with the wireless network (e.g., a protocol data unit ("PDU") session), a modification of an existing session with the wireless network, and/or some other type of communication.

In some embodiments, the request may be sent from one or more routing elements of the wireless network (e.g., a router or other suitable device or system), based on a request or other message from UE 101. Thus, while the request (at 102) is shown in the figure as originating from UE 101, in practice, the request may originate from one or more devices or systems that are communicatively coupled to UE 101. The dashed lines in this figure denote that the request may traverse one or more devices or systems (e.g., routers, VNFs, and/or other devices or systems), and/or may originate from the one or more devices or systems other than UE 101.

As further shown, the request may be received from VNF Selection Component 103. In some embodiments, VNF Selection Component 103 may include Domain Name System ("DNS") functionality, and/or may be communicatively coupled to a DNS component (not shown). For example, as shown, VNF Selection Component 103 may receive (at 106) information associating particular types of VNFs (and/or FQDNs, where a particular type of VNF may be referenced by a particular FQDN) to IP addresses of instances of these VNFs.

Figure 2:
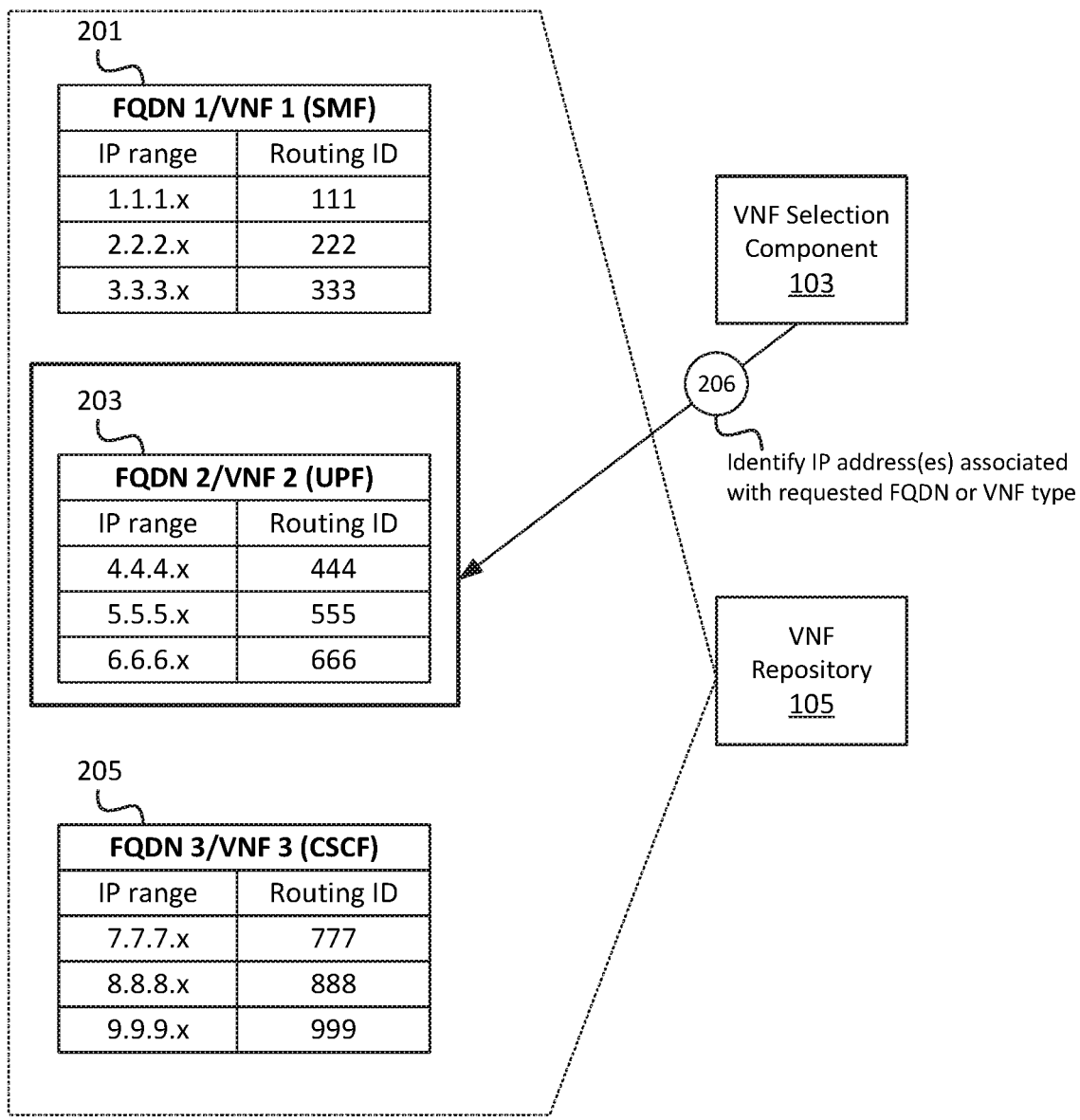
FIG. 2 illustrates the example selection of a set of candidate Internet Protocol ("IP") addresses associated with VNF instances that correspond to a requested VNF type and/or Fully Qualified Domain Name ("FQDN"), in accordance with some embodiments.

FIG. 2 illustrates an example data structures 201, 203, and 205, which may be maintained and/or provided by VNF Repository 105. For example, as shown, data structure 201 may include IP addresses associated with a first type of VNF ("VNF 1"). Additionally, or alternatively, the IP addresses may be associated with a particular FQDN (e.g., a FQDN associated with the particular VNF type). In this example, data structure 201 may be associated with VNF instances that implement a SMF associated with the wireless telecommunications network, data structure 203 may be associated with VNF instances that implement a UPF, and data structure 205 may be associated with VNF instances that implement a Call Session Control Function ("CSCF").

In this example, IP addresses may be specified in terms of IP address ranges. For example, as shown here, VNFs having a particular FQDN ("FQDN 1" in this example) or type ("VNF 1" in this example), such as an SMF, may have IP addresses beginning with "1.1.1" (denoted in the figure as "1.1.1.x"). Other VNFs of this same type (e.g., implemented by different data centers) may also have IP addresses in the "2.2.2.x" and "3.3.3.x" ranges. While IP address ranges are sometimes discussed herein using a "1.1.1.x" notation, similar concepts may apply using different notations for IP address ranges (e.g., "1.1.1.0-1.1.1.255", "1.1.1.0/24," or other suitable notations).

In some embodiments, VNF Repository 105 may, in some embodiments, maintain information mapping routing identifiers ("IDs") to the VNF instances and/or IP address ranges. The routing IDs may be identifiers used by a dynamic routing technique, such as a Border Gateway Protocol ("BGP") routing technique or other suitable dynamic routing technique. The routing ID may be, for example, an Autonomous System Number ("ASN") or other suitable identifier.

As further shown in FIG. 2, VNF Selection Component 103 may identify (at 206) IP addresses associated with a requested FQDN and/or VNF type (e.g., may select a particular one of data structures 201, 203, or 205). For example, returning to the example of FIG. 1, VNF Selection Component 103 may have received (at 102) a request for an IP address (e.g., a DNS request) associated with a VNF that provides UPF functionality. This request (at 102) may, for example, include a particular FQDN, based on which VNF Selection Component 103 may determine that an IP address of a UPF is being requested. As further shown in FIG. 1, VNF Selection Component 103 may obtain (at 108) route information between UE 101 and/or some other entity from which the request was received (at 102).

Figure 3:
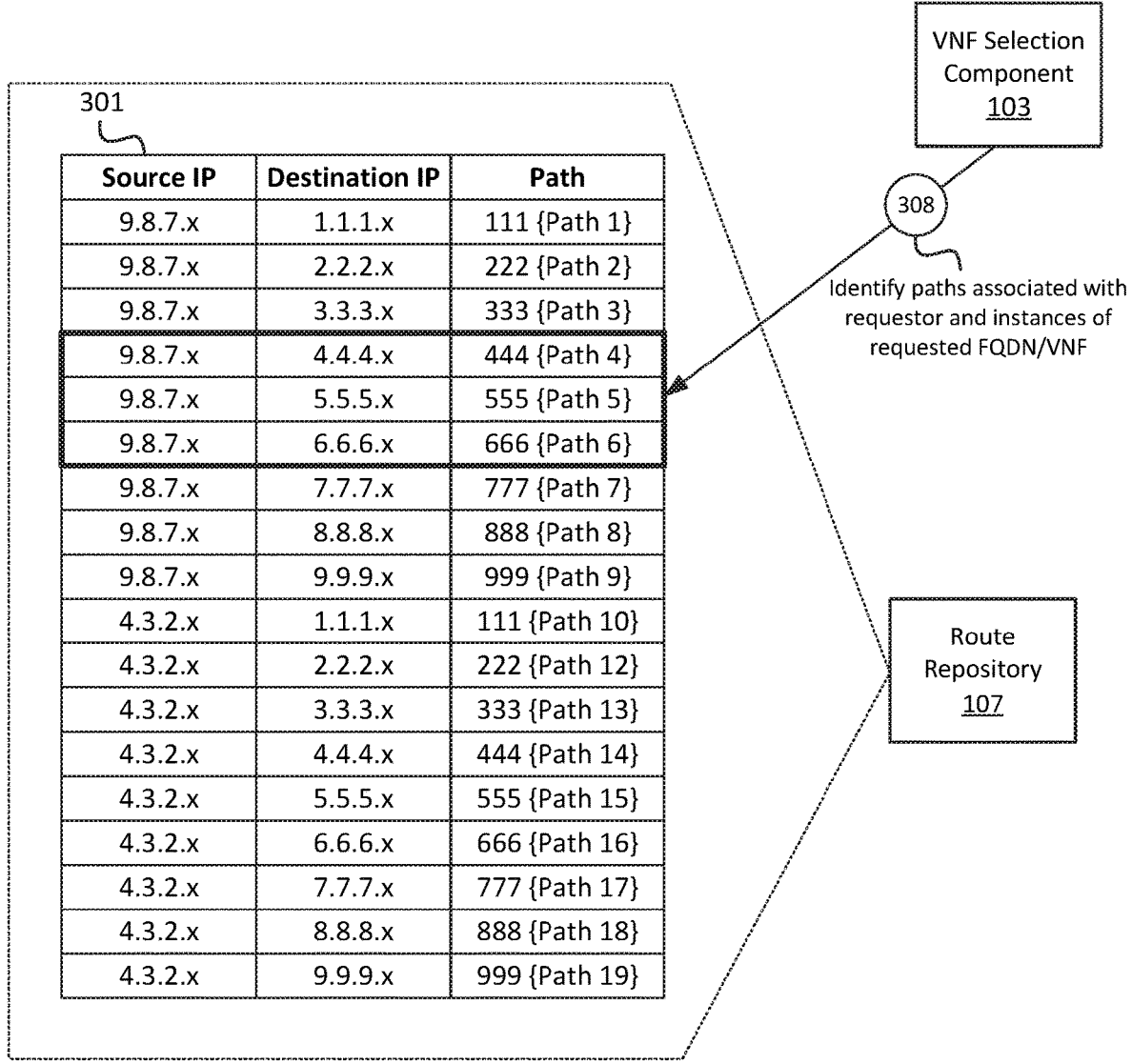
FIG. 3 illustrates the example identification of a set of candidate paths, between a requestor and the identified VNF instances, in accordance with some embodiments.

For example, as shown in FIG. 3, Route Repository 107 may maintain data structure 301, which may indicate paths (or routes) between particular sets of IP addresses and/or routing IDs. For example, in accordance with the dynamic routing technique (e.g., BGP), each VNF (or a router, controller, or other BGP component associated with each VNF) may determine routes between itself and other elements that implement the dynamic routing technique. Further, the VNFs may advertise these routes (e.g., using a BGP Advertisement message or other suitable type of broadcast or message). These routes may be received, maintained, and/or propagated by Route Repository 107. For example, Route Repository 107 may be, or may include, a BGP Route Reflector and/or some other suitable component.

While shown in FIG. 3 as "Source IP" and "Destination IP," paths may be bi-directional in some embodiments. That is, the same path may used for traffic between two IP addresses independent of which IP address is the source of the traffic and which IP address is the destination. In other embodiments, different paths may be maintained for the same pair of IP addresses, depending on which IP address is the source and which is the destination of traffic.

In some embodiments, paths may be expressed in terms of routing IDs (e.g., ASNs). For example, the notation "111 {Path 1}" shown in this figure, for the path between Source IP address range "9.8.7.x" and Destination IP address range "1.1.1.x" may denote that traffic directed to IP address in the 1.1.1.x range has a path of particular routing IDs, denoted as {Path 1}, ending at the routing ID (111, in this example) associated with the destination IP address. Referring back to FIG. 2, for instance, the routing ID (e.g., ASN) associated with the IP address range "1.1.1.x" is "111." In the context of the example shown in FIG. 1, the IP address range "9.8.7.x" may include the IP address of UE 101, while the IP address range "4.3.2.x" may include IP addresses of other UEs (e.g., other than requesting UE 101).

While one path is shown in this figure for each set of Source IP addresses and Destination IP addresses, in practice, Route Repository 107 may maintain multiple paths between each set of Source IP addresses and Destination IP addresses. For example, while Path 4 is shown as the path between IP address ranges "9.8.7.x" and "4.4.4.x," in practice, data structure 301 may include multiple paths (e.g., Path 20, Path 21, etc. (not shown)) between IP address ranges "9.8.7.x" and "4.4.4.x."

Once the routes are obtained (at 108) from Route Repository 107, VNF Selection Component 103 may identify (at 308) routes (or paths) associated with the requestor (e.g., UE 101) and instances of the requested FQDN and/or VNF type. For example, as shown in FIG. 3, VNF Selection Component 103 may identify that Paths 4, 5, and 6 are paths between UE 101 and instances of VNFs that are of the type requested by UE 101.

Returning to FIG. 1, once VNF Selection Component 103 has obtained (at 108) route information between UE 101 and instances of the requested VNF, VNF Selection Component 103 may obtain (at 110) costs and/or other metrics of the routes between UE 101 and the identified VNF instances. For example, VNF Selection Component 103 may receive cost and/or metric information, associated with the routes, from Route Cost Component 109.

In some embodiments, Route Cost Component 109 may determine costs and/or other metrics associated with the routes maintained and/or provided by Route Repository 107. For example, Route Cost Component 109 may determine the costs and/or metrics of each route based on a quantity of hops in each route. In some embodiments, Route Cost Component 109 may determine performance metrics associated with each route, such as latency, throughput, etc. The performance metrics may be determined based on results of practical tests (e.g., sending "ping" messages and/or other suitable messages via each route), and/or determined in some other suitable manner. In some embodiments, Route Cost Component 109 may determine the costs and/or metrics based on information regarding a physical locations of each hardware that implements routing elements indicated in each route. For example, the costs and/or metrics may be based on straight-line distances between such hardware, and/or based on distances of fiber and/or other communication links between such hardware.

Figure 4:
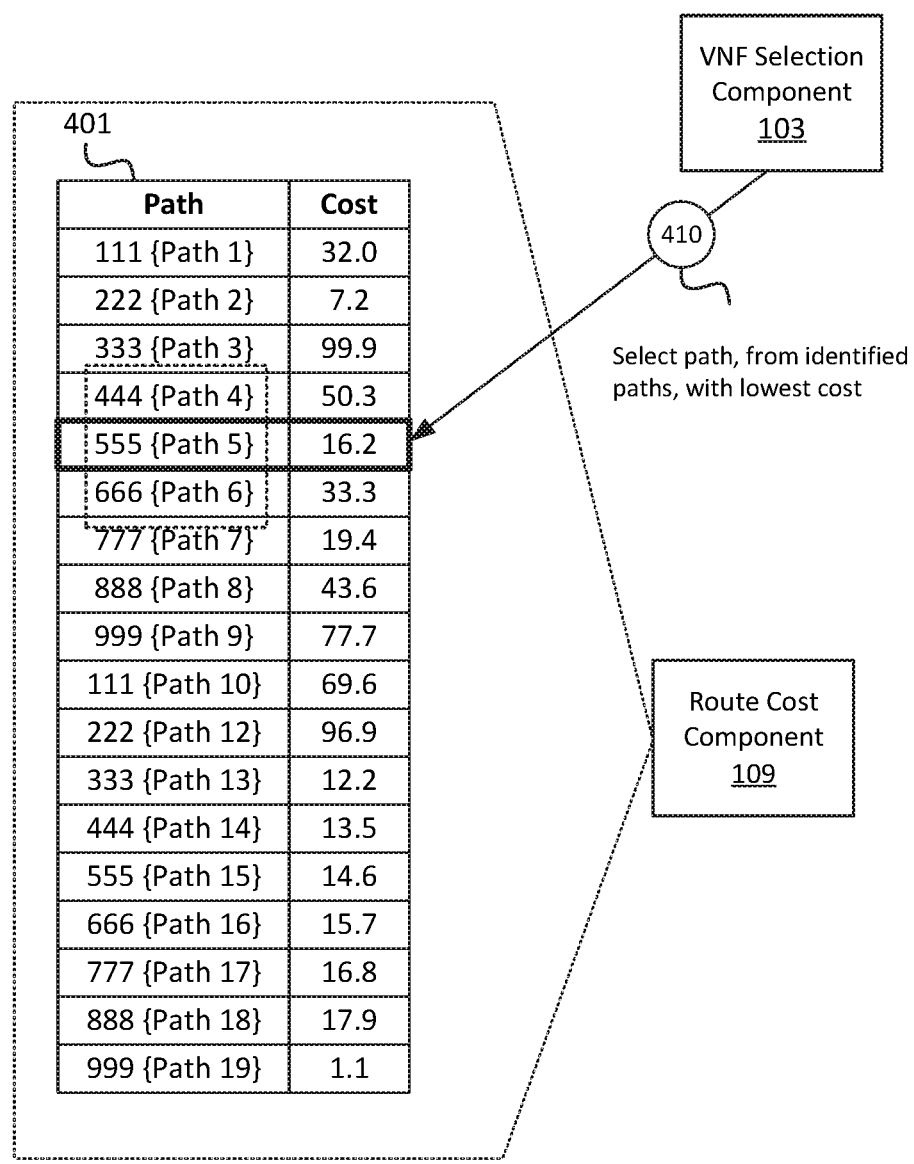
FIG. 4 illustrates the example selection of a particular VNF instance based on costs or other metrics associated with the candidate paths between the requestor and the identified VNF instances, in accordance with some embodiments.

In some embodiments, the costs and/or metrics may be based on some combination of the above factors, and/or one or more other suitable factors in addition to, or in lieu of, those enumerated above. In the example shown in FIG. 4, costs are reflected in terms of a score between 0-100. In some embodiments, the scores and/or metrics may be indicated in another suitable manner.

As shown, Paths 4, 5, and 6 (e.g., as identified at 308 in FIG. 3) may have associated cost scores of 50.3, 16.2, and 33.3, respectively. In this example, VNF Selection Component 103 may select (at 410) Path 5, based on Path 5 being associated with the lowest score (16.2) out of the paths between UE 101 and instances of the requested VNF. As further shown, other paths may be associated with lower costs (e.g., Path 19 is associated with a score of 1.1), but these paths may be ineligible for selection, as these are not paths between UE 101 and instances of the requested VNF.

Referring back to FIG. 1, VNF Selection Component 103 may select (at 112) a particular VNF instance, based on the identified costs and/or metrics. As noted in the figure, arrow 112 (of FIG. 1) may include some or all of the operations shown in FIGS. 2-4, including the identification of a particular VNF type, as well as the selection of a particular instance of the particular VNF type. As shown, for example, three types of VNFs (e.g., implementing different network functions) may be implemented by various instances, such as instances 111-1 and 111-2 of a first VNF type ("VNF 1"), instances 113-1 through 113-3 of a second VNF type ("VNF 2"), and instances 115-1 and 115-2 of a third VNF type ("VNF 3"). For example, as similarly mentioned above with respect to FIG. 2, VNF 1 (e.g., instances 111-1 and 111-2) may implement SMF functionality, VNF 2 may implement UPF functionality, and VNF 3 may implement CSCF functionality for the wireless telecommunications network.

Thus, the selection (at 112) may be of a particular instance of VNF 113, and not of VNF 111 or VNF 115. Further, as similarly discussed above, VNF Selection Component 103 may select VNF instance 113-2 (and not VNF instance 113-1 or 113-3) based on costs and/or metrics associated with VNF instances 113-1 through 113-3. For example, VNF Selection Component 103 may determine that the cost associated with a route (e.g., a lowest-cost route, or a "best" route) between VNF instance 113-2 and UE 101 is lower than costs associated with routes (e.g., lowest-cost routes, or "best" routes) between VNF instance 113-1 and UE 101, and between VNF instance 113-3 and UE 101.

In some embodiments, the metrics and/or selection criteria may be configurable (e.g., by an owner and/or operator of the wireless telecommunications network). For example, different VNFs may have different techniques for determining cost and/or metrics. As one example, a VNF instance implementing a UPF may be selected based on throughput associated with the VNF instance, while a VNF instance implementing a SMF or CSCF may be selected based on a quantity of hops between a requesting UE and the VNF instance. For example, VNF Selection Component 103 may be associated with an application programming interface ("API"), a portal, and/or some other type of interface via which the metrics and/or selection criteria may be changed.

Figure 5:
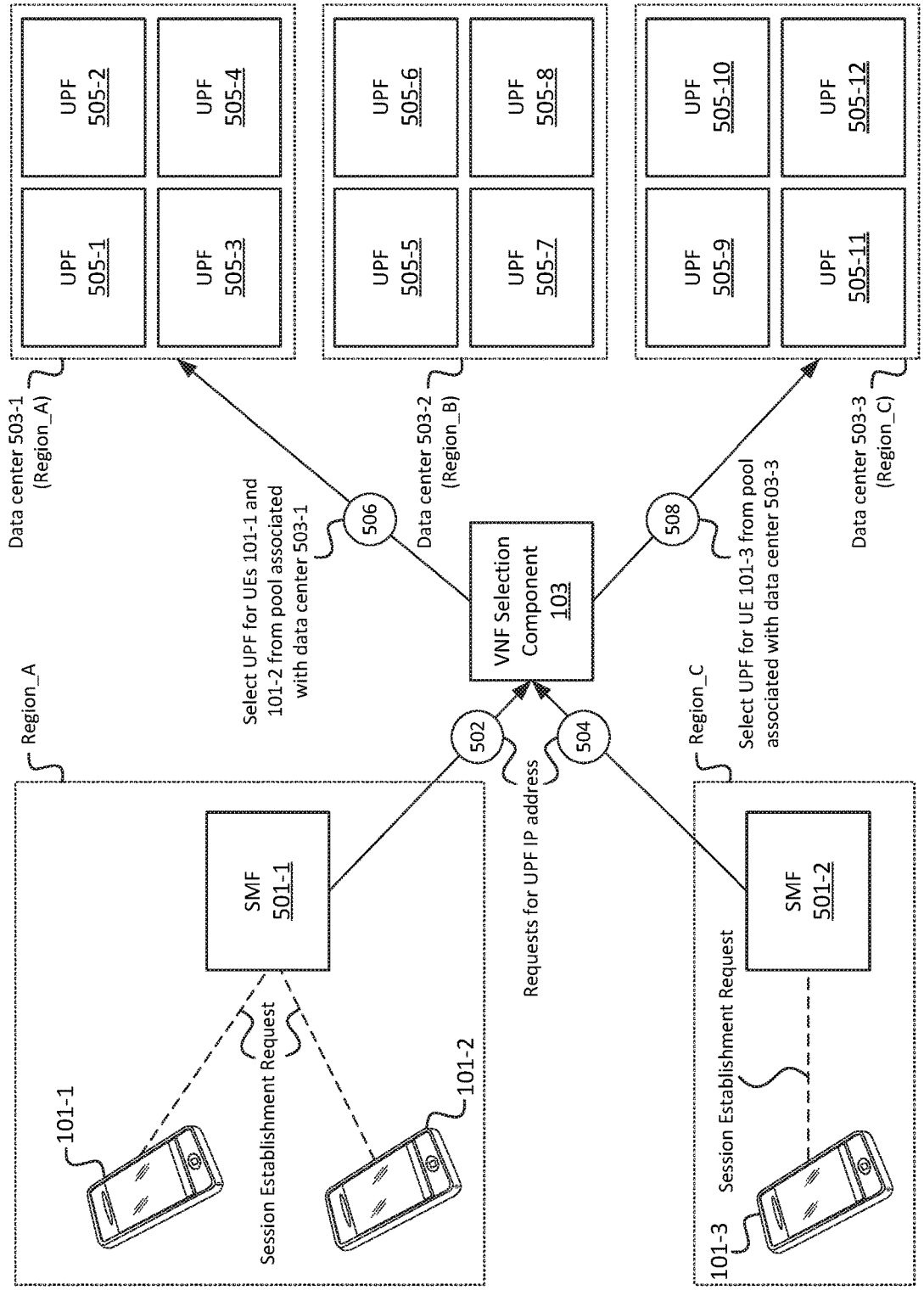
FIG. 5 illustrates the example selection/assignment of VNFs for 5UEs in different geographical regions, in accordance with some embodiments.

FIG. 5 illustrates an example situation in which different UEs 101, located in different regions, may have different VNFs assigned as part of a session establishment procedure. For example, as shown, UEs 101-1 and 101-2 may be located in a first geographical region ("Region_A"), while UE 101-3 may be located in a second geographical region ("Region_B"). These different regions may be for example, different cities, states, provinces, tracking areas ("TAs"), and/or some other suitable delineation of regions.

In some embodiments, a "region" may be defined in terms of connectivity to a particular SMF 501. For example, UEs 101 that are considered to be in Region_A may be so considered due to being associated with SMF 501-1, while UEs 101 that are considered to be in Region_C may be so considered due to being associated with SMF 501-2. In accordance with this example, operations performed by SMFs 501-1 and 501-2 may be performed based on session establishment requests received from respective UEs 101. For example, SMF 501-1 may receive messages indicating that UEs 101-1 and 101-2 are requesting a user plane data session (e.g., a protocol data unit PDU Session). While shown in the figure as "Session Establishment Request" between UEs 101 and SMF 501, in practice, one or more other suitable types of messages may be used. Additionally, while shown as being a communication between UEs 101 and SMF 501, in practice, one or more other devices or systems may be involved in such communications (e.g., an AMF, a gNB, one or more routers, etc.), and may generate or output suitable messages to facilitate the providing of the request to SMF 501 and/or otherwise indicating to SMF 501 that UE 101 is requesting a communication session. In some embodiments, SMF 501 may generate and/or otherwise determine an IP address, IP address range, routing ID, and/or other suitable identifier associated with UE 101.

Based on receiving the indications that UEs 101-1 and 101-2 are requesting a communication session, SMF 501-1 may request (at 502) an IP address for a UPF to assign to UEs 101-1 and 101-2. Similarly, VNF Selection Component 103 may receive (from 501-2) a request for an IP address for a UPF to assign to UE 101-3, located in Region_C. In some embodiments, the requests (at 502 and/or 504) may be, or may include, DNS requests for an FQDN that indicates that an IP address for a UPF is being requested. These requests (at 502 and/or 504) may also include the IP addresses of respective UEs 101-1 through 101-3, and/or may include the IP addresses of respective SMFs 501-1 and/or 501-2.

As further shown, various data centers 503 may be geographically distributed. For example, as shown, data center 503-1 may be a data center that is located in, or is otherwise associated with, Region_A, data center 503-2 may be located in Region_B, and data center 503-3 may be located in Region_C. Data center 503-1 may include a first set of UPFs (including UPFs 505-1 through 505-4), data center 503-2 may include a second set of UPFs (including UPFs 505-5 through 505-8), and data center 503-3 may include a third set of UPFs (including UPFs 505-9 through 505-12). While each example data center 503 is shown here as including four UPFs 505, in practice, data centers 503 may include additional or fewer UPFs 505. Further, while each data center 503 is shown here as including the same quantity of UPFs 505, in practice, different data centers 503 may include different quantities of UPFs 505.

In accordance with some embodiments, VNF Selection Component 103 may select UPFs (or UPF pools) based on routing metrics or costs associated with UPFs of data centers 503-1 through 503-3. For example, as discussed above, when selecting a particular UPF 505 for UE 101-1 and/or UE 101-2, VNF Selection Component 103 may identify scores and/or metrics associated with routes between UPFs 505 and UEs 101-1 and UE 101-2. Specifically, for example, UPFs 505-1 through 505-4, associated with data center 503-1, may be associated with a first IP address range and/or routing ID, UPFs 505-5 through 505-8, associated with data center 503-2, may be associated with a second IP address range and/or routing ID, and UPFs 505-9 through 505-12, associated with data center 503-3, may be associated with a third IP address range and/or routing ID. As described above, based on the IP address ranges and/or routing IDs associated with UPFs 505 (or, in some embodiments, with respective data centers 503), and further based on the IP addresses of UEs 101-1 and 101-2, VNF Selection Component 103 may identify routes having the lowest cost, highest metrics, etc. between UPFs 505 (or data centers 503) and UEs 101-1 and 101-2. In some embodiments, in lieu of using the IP addresses of UEs 101-1 and 101-2, VNF Selection Component 103 may select a UPF 505 for these UEs 101 based on the IP address of SMF 501-1.

In this example, VNF Selection Component 103 may determine that routes between data center 503-1 and UEs 101-1 and 101-2 have a lowest cost, and may accordingly select (at 506) data center 503-1. In some embodiments, VNF Selection Component 103 may output an instruction or other message to data center 503-1, indicating that data center 503-1 has been selected to provide UPF functionality for UEs 101-1 and 101-2. Data center 503-1 (e.g., a controller, router, etc. associated with data center 503-1) may accordingly select a particular one of UPFs 505-1 through 505-4. While not described in detail here, data center 503-1 may utilize any suitable technique in selecting a particular UPF 505 for UEs 101-1 and 101-2 (e.g., a particular UPF 505 that falls within the IP address range associated with data center 503-1). Data center 503-1 may, in some embodiments, notify VNF Selection Component 103 of the particular IP address of the particular UPF 505 that data center 503-1 has selected to serve UEs 101-1 and/or 101-2. As similarly shown, VNF Selection Component 103 may select (at 508) data center 501-3 for UE 101-3 (e.g., based on routing metrics or scores indicating that data center 503-3 is most suitable for UE 101-3), and SMF 501-3 may notify VNF Selection Component 103 of the particular UPF 505 that SMF 501-3 has selected to serve UE 101-3.

While shown in this figure as implementing pools of UPFs 505, in practice, data centers 503 may include virtual machines and/or other configurable hardware, via which other VNFs may be instantiated, in addition to, or in lieu of, UPFs 505. For example, when selecting (at 506) data center 503-1, VNF Selection Component 103 may instruct data center 503-1 to instantiate a UPF on configurable resources, or to select an already instantiated UPF. Further, data center 503-1 may include other VNFs, in addition to the UPF that VNF Selection Component 103 instructs data center 503-1 to instantiate or to utilize. For example, in addition to UPFs 505, data center 503-1 may include CSCFs, UDMs, and/or other VNFs. Additionally, data center 503-1 may include un-provisioned resources, on which data center 503-1 may instantiate the requested UPF 505 and/or other VNFs.

In this example, the selections of UPFs 505 (or data centers 503) for UEs 101 may be based on geographic location. For example, VNF Selection Component 103 may determine that data center 503-1 is geographically closest to UEs 101-1 and 101-2 (and/or to SMF 501-1), and may determine that data center 503-3 is geographically closest to UE 101-3 (and/or to SMF 501-2). In some embodiments, the geographic locations themselves may not be a factor in the selection of UPFs 505 and/or data centers 503, but may be generally related to (or independent of) metrics that are used. For example, data center 503-1 may be reachable to UEs 101-1 and 101-2 (and/or SMF 501-1) via a smallest quantity of routing hops, and data center 503-3 may be reachable to UE 101-3 (and/or SMF 501-2) via a smallest quantity of routing hops.

While not explicitly shown here, once VNF Selection Component 103 selects (at 506 and 508) UPFs 505 to serve UEs 101-1, 101-2 (e.g., in conjunction with data center 503-1) and/or 101-3 (e.g., in conjunction with data center 503-3), VNF Selection Component 103 may provide the IP addresses associated with the selected UPFs 505 to respective SMFs 501-1 and 501-2. SMFs 501-1 and 501-2 to may provide the selected IP addresses of respective selected UPFs 505 to UEs 101-1 through 101-3, to facilitate the communication of user plane traffic between UEs 101-1 through 101-3 and respective selected UPFs 505.

Figure 6:
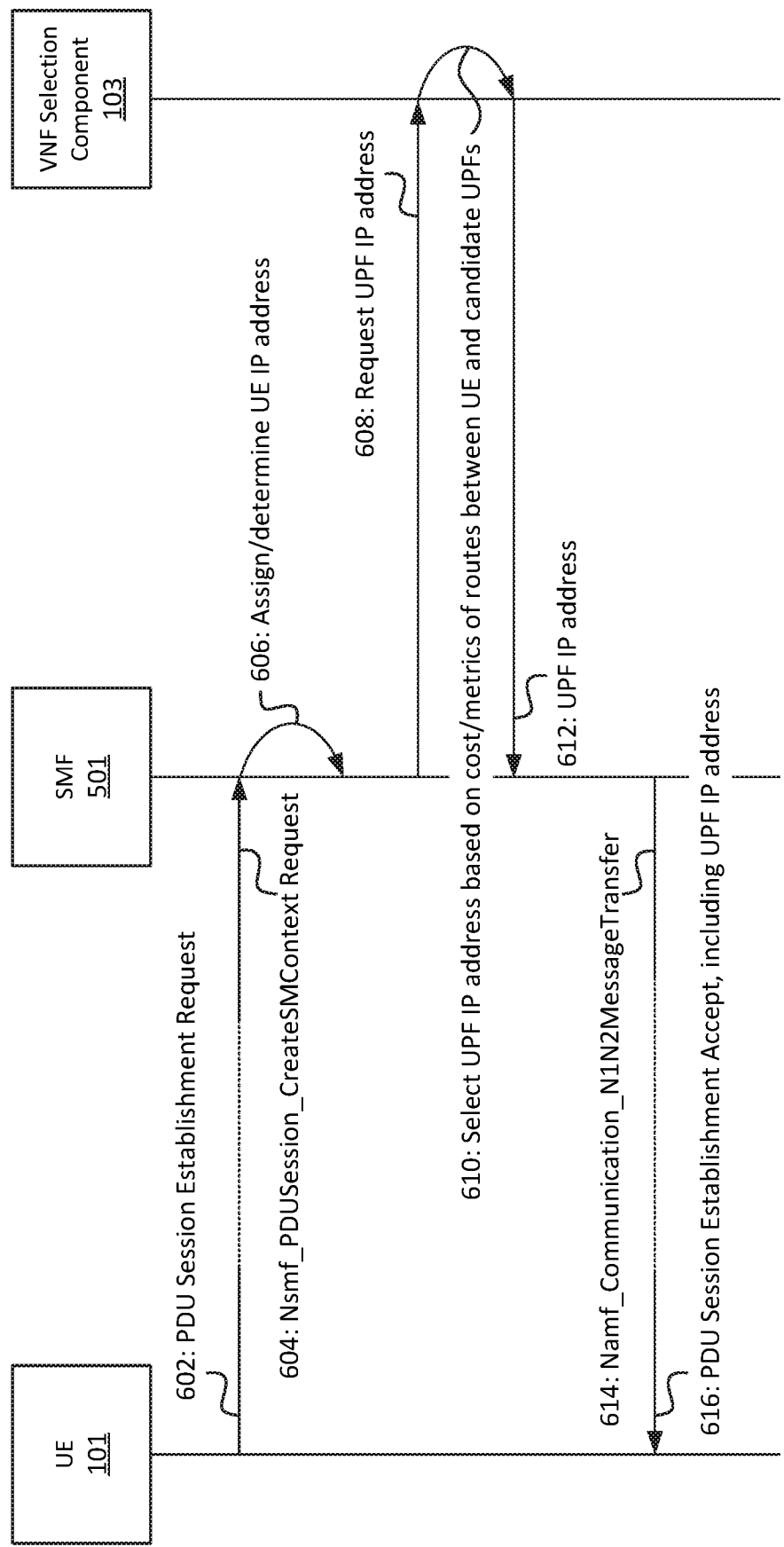
FIG. 6 illustrates an example process for selecting a particular VNF in response to a request associated with a particular UE, in accordance with some embodiments.

FIG. 6 illustrates example signaling, between UE 101, SMF 501, and VNF Selection Component 103, in which a particular UPF 505 may be selected for UE 101 (e.g., based on a request to establish user plane communications for UE 101). This figure shows only a select few signals involved in the communication session establishment process. Specifically, the signals shown in FIG. 6 are related to the selection of a UPF during the session establishment process, and other signals may be involved in other aspects of the session establishment process. Further, some signals may be processed by other devices or systems not shown here (e.g., by a gNB, an AMF, etc.).

For example, as shown, UE 101 may output (at 602) a PDU Session Establishment Request, and SMF 501 may receive (at 604) a Nsmf_PDUSession_CreateSMContext Request. As denoted by the dotted line, one or more other intervening devices or systems may receive the PDU Session Establishment Request from UE 101, and generate/output the Nsmf_PDUSession_CreateSMContext Request to SMF 501. For example, in some embodiments, an AMF may receive the Session Establishment Request from UE 101, generate the Nsmf_PDUSession_CreateSMContext Request based on the PDU Session Establishment Request, and may output the Nsmf_PDUSession_CreateSMContext Request to SMF 501. While the contents of these messages, and the process of generating such messages, are not described here for the sake of brevity, generally, the Nsmf_PDUSession_CreateSMContext Request may indicate to SMF 501 that UE 101 is requesting a user plane communication session (e.g., a PDU Session).

SMF 501 may, based on this request (at 604), assign and/or determine (at 606) an IP address for UE 101. In some embodiments, while not shown, this assignment and/or determination may include communicating with a Unified Data Management function ("UDM") or other device or system to obtain information associated with UE 101, such as subscription information.

As further shown, SMF 501 select a UPF to associate with the requested PDU session (e.g., to serve UE 101). While not shown, prior to selecting the UPF, SMF 501 may perform other operations, such as authenticating UE 101, selecting a Policy Control Function ("PCF"), receiving rules and/or policies associated with UE 101 from the PCF, and/or other operations. As part of this selection, SMF 501 may request (at 608) an IP address of a UPF from VNF Selection Component 103. As discussed above, this request (at 608) may include the IP address of 101 (assigned at 606) and/or the IP address of SMF 501. VNF Selection Component 103 may select (at 610) a particular UPF (e.g., as similarly discussed above) based on routing metrics or costs of routes between UE 101 (or SMF 501) and a set of candidate UPFs (or data centers that include VNFs that implement, or can be configured to implement, UPF functionality). VNF Selection Component 103 may provide (at 612) the IP address of the selected UPF to SMF 501, which may provide the IP address to UE 101.

For example, as denoted by the dashed line between SMF 501 and UE 101, SMF 501 may output (at 614) a Namf_Communication_N1N2MessageTransfer message to an AMF, which may output a N2 PDU Session Request to a gNB to which UE 101 is connected, which may output (at 616) a PDU Session Establishment Accept message to UE 101. These messages (e.g., at 614, 616, and as denoted by the dashed lines) may include the IP address of the selected UPF. UE 101 may accordingly proceed to communicate with the selected UPF by indicating the IP address as the destination of user plane traffic from UE 101.

Figure 7:
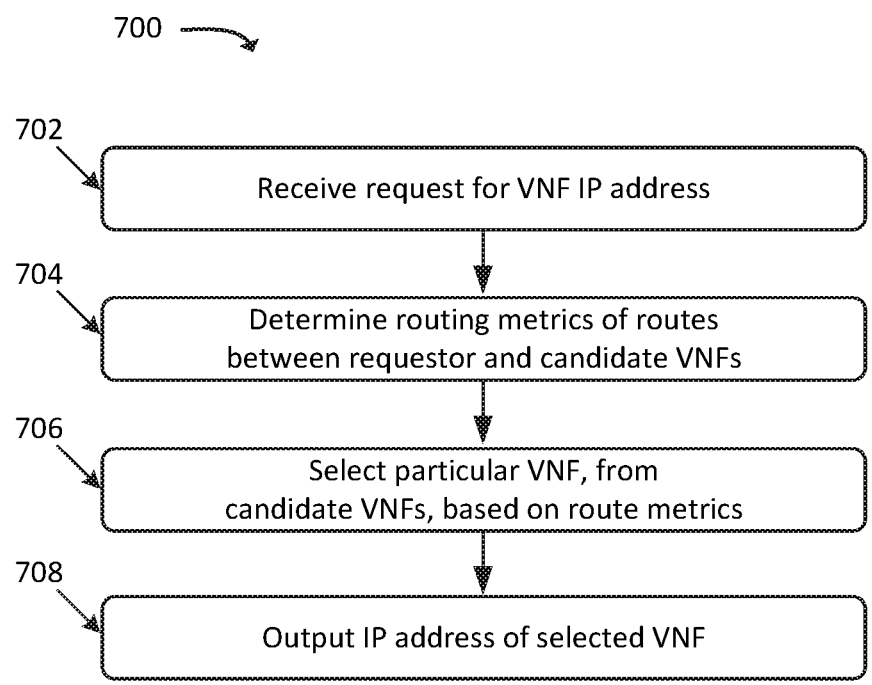
FIG. 7 illustrates an example process for selecting a VNF based on routing metrics or scores of routes between a requestor and a particular VNF, in accordance with some embodiments.

FIG. 7 illustrates an example process 700 for selecting a VNF based on routing metrics or scores of routes between a requestor and a particular VNF. In some embodiments, some or all of process 700 may be performed by VNF Selection Component 103. In some embodiments, one or more other devices may perform some or all of process 700 (e.g., in concert with, and/or in lieu of, VNF Selection Component 103).

As shown, process 700 may include receiving (at 702) a request for an IP address of a VNF. For example, VNF Selection Component 103 may receive the request from one or more elements of a wireless telecommunications network, such as one or more routers, VNFs, and/or other devices or systems associated with a 5G core network, a Long-Term Evolution ("LTE") core network, etc. In some embodiments, the request may include an IP address, routing ID (e.g., ASN), and/or other identifier associated with a requestor. For example, the request may include an IP address of a UE. In some embodiments, the request may include an indicator of a type of VNF that is being requested. The indicator may be, or include, a FQDN or some other type of identifier of the requested type of VNF.

Process 700 may further include determining (at 704) routing metrics and/or scores associated with routes between the requestor and a set of candidate VNFs. For example, VNF Selection Component 103 may determine and/or receive (e.g., from Route Cost Component 109) information regarding metrics, scores, etc. for routes between the IP address or routing ID of the requestor and one or more VNFs that match the requested VNF type. In some embodiments, VNF Selection Component 103 may determine metrics and/or scores differently based on the VNF type, and/or based on information associated with the requestor. For example, if the requestor is a particular UE 101, VNF Selection Component 103 may receive (e.g., from a UDM, Home Subscriber Server ("HSS"), and/or some other device or system) information regarding a subscription associated with UE 101, based on which VNF Selection Component 103 may evaluate scores and/or metrics differently. For example, if UE 101 is associated with a first type of subscription, VNF Selection Component 103 may prioritize latency when determining scores for VNFs based on route metrics (e.g., may determine routing metrics associated with latencies of candidate VNFs). If, on the other hand, UE 101 is associated with a second type of subscription, VNF Selection Component 103 may prioritize physical distance when determining scores for VNFs based on route metrics (e.g., may determine routing metrics associated with distances of candidate VNFs from UE 101).

Process 700 may additionally include selecting (at 706) a particular VNF, from the set of candidate VNFs, based on the route metrics. For example, VNF Selection Component 103 may select a VNF with a lowest cost, a highest score, etc. As similarly discussed above, these scores may be different, and/or VNF Selection Component 103 may select a VNF based on different scores or metrics, based on varying factors. VNF Selection Component 103 may also determine or identify the IP address of the selected VNF. As discussed above, selecting the particular VNF may include instructing a controller, router, hypervisor, etc. associated with a set of configurable resources (e.g., nodes in a virtual computing environment) to provision an instance of the particular type of VNF, and the controller, router, etc. may provide the IP address of the VNF to VNF Selection Component 103.

Process 700 may also include outputting (at 708) the IP address of the selected VNF. For example, VNF Selection Component 103 may output the IP address of the selected VNF to the requestor (e.g., UE 101). In some embodiments, VNF Selection Component 103 may provide the request as part of a DNS record response.

Figure 8:
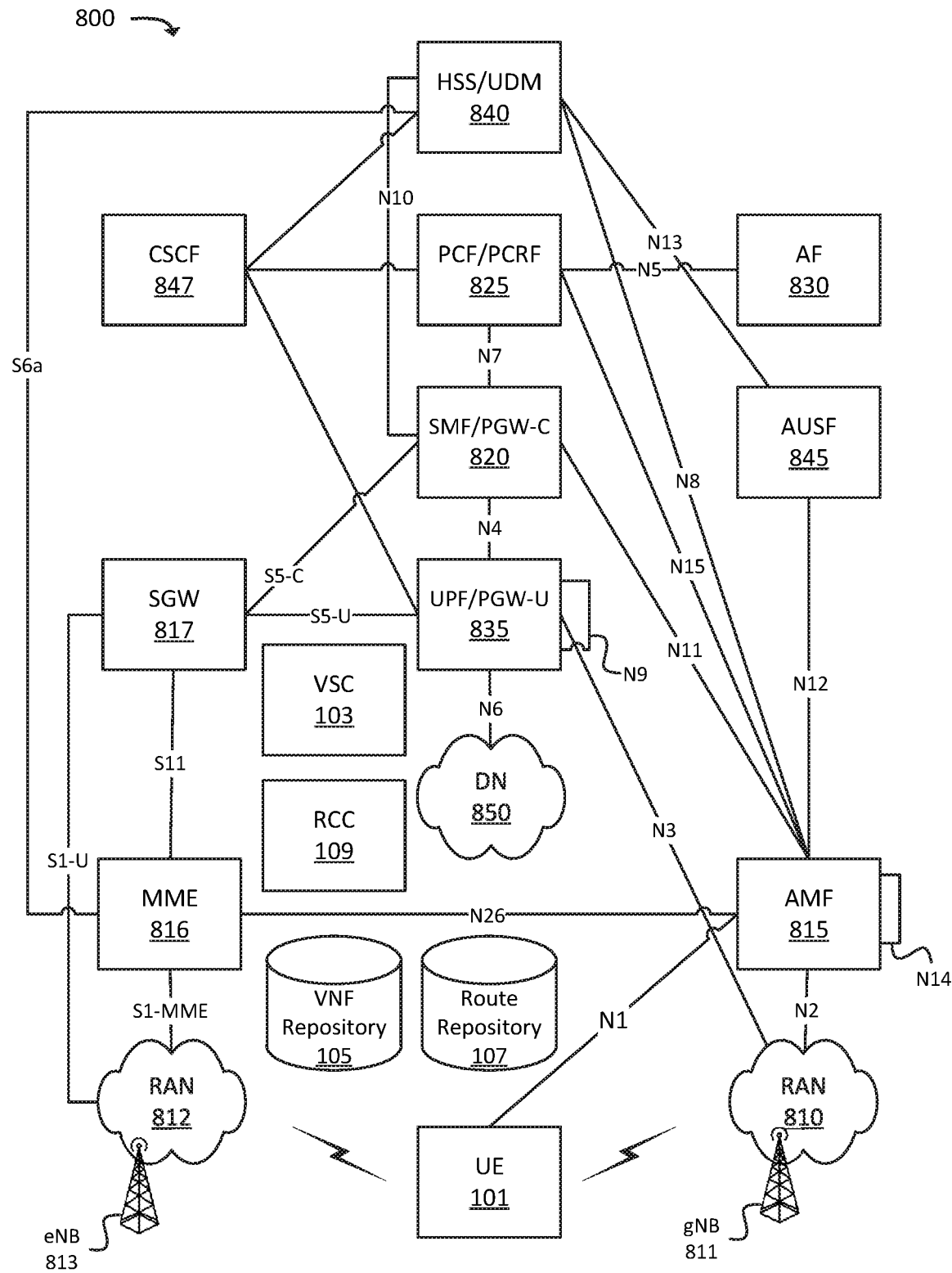
FIG. 8 illustrates an example environment in which one or more embodiments, described herein, may be implemented.

FIG. 8 illustrates an example environment 800, in which one or more embodiments may be implemented. In some embodiments, environment 800 may correspond to a 5G network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a LTE RAT), and/or in which elements of a 5G core network may be implemented by, may be communicatively coupled with, and/or may include elements of another type of core network (e.g., an EPC). As shown, environment 800 may include UE 101, RAN 810 (which may include one or more Next Generation Node Bs ("gNBs") 811), RAN 812 (which may include one or more one or more eNBs 813), AMF 815, Mobility Management Entity ("MME") 816, Serving Gateway ("SGW") 817, SMF/Packet Data Network ("PDN") Gateway ("PGW")-Control plane function ("PGW-C") 820, PCF/Policy Charging and Rules Function ("PCRF") 825, Application Function ("AF") 830, UPF/PGW-User plane function ("PGW-U") 835, HSS/UDM 840, Authentication Server Function ("AUSF") 845, CSCF 847, VNF Selection Component 103, VNF Repository 105, Route Repository 107, Route Cost Component 109, and Data Network ("DN") 850. In some embodiments, PGW-U 835 and PGW-C 820 may correspond to a Control and User Plane Separation ("CUPS") architecture.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. For example, these routers, modems, gateways, etc., may implement a dynamic routing technique (such as BGP or some other suitable routing technique). These elements (e.g., routers, modems, gateways, etc.) may be associated with a unique identifier associated with the dynamic routing technique (e.g., an ASN). Each element may, according to the dynamic routing technique, calculate or determine paths between itself and one or more other devices or systems. For example, each router that implements the dynamic routing technique may calculate or determine a path between an IP address associated with UE 101 and itself In some embodiments, as similarly discussed above, the paths may be expressed in terms of identifiers associated with the dynamic routing technique (e.g., BGP).

In some embodiments, one or more of the devices of environment 800 may perform one or more functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 101 may include a computation and communication device, such as a wireless mobile communication device that is capable of communicating with RAN 810 and/or DN 850. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, an Internet of Things ("IoT") device, or another type of mobile computation and communication device. UE 101 may send traffic to and/or receive traffic (e.g., user plane traffic) from DN 850 via RAN 810 and UPF/PGW-U 835.

RAN 810 may be, or may include, a 5G RAN that includes one or more base stations (e.g., one or more gNBs 811), via which UE 101 may communicate with one or more other elements of environment 800. UE 101 may communicate with RAN 810 via an air interface (e.g., as provided by gNB 811). For instance, RAN 810 may receive traffic (e.g., voice call traffic, data traffic, messaging traffic, signaling traffic, etc.) from UE 101 via the air interface, and may communicate the traffic to UPF/PGW-U 835, and/or one or more other devices or networks. Similarly, RAN 810 may receive traffic intended for UE 101 (e.g., from UPF/PGW-U 835, AMF 815, and/or one or more other devices or networks) and may communicate the traffic to UE 101 via the air interface.

RAN 812 may be, or may include, an LTE RAN that includes one or more base stations (e.g., one or more eNBs 813), via which UE 101 may communicate with one or more other elements of environment 800. UE 101 may communicate with RAN 812 via an air interface (e.g., as provided by eNB 813). For instance, RAN 810 may receive traffic (e.g., voice call traffic, data traffic, messaging traffic, signaling traffic, etc.) from UE 101 via the air interface, and may communicate the traffic to UPF/PGW-U 835, and/or one or more other devices or networks. Similarly, RAN 810 may receive traffic intended for UE 101 (e.g., from UPF/PGW-U 835, SGW 817, and/or one or more other devices or networks) and may communicate the traffic to UE 101 via the air interface.

In some embodiments, some or all of the network devices or systems shown in FIG. 8 may be implemented by VNFs implemented by configurable or provisioned hardware resources. For example, VNFs may be implemented by cloud computing systems, virtualized computing systems, or the like. For example, one or more data centers (e.g., data centers 503, as described above) may include hardware resources that may be provisioned to implement some or all of the functions shown in FIG. 8. A "data center" may include a physical facility, and/or may refer to a particular set of devices. In some embodiments, different data centers may be defined in terms of different ASNs or other identifiers used in a dynamic routing technique (e.g., BGP).

AMF 815 may include one or more devices, systems, VNFs, etc., that perform operations to register UE 101 with the 5G network, to establish bearer channels associated with a session with UE 101, to hand off UE 101 from the 5G network to another network, to hand off UE 101 from the other network to the 5G network, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, etc., that perform operations to register UE 801 with the EPC, to establish bearer channels associated with a session with UE 801, to hand off UE 801 from the EPC to another network, to hand off UE 801 from another network to the EPC, manage mobility of UE 801 between RANs 812 and/or eNBs 813, and/or to perform other operations.

SGW 817 may include one or more devices, systems, VNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, etc., that gather, process, store, and/or provide information in a manner described herein. SMF/PGW-C 820 may, for example, facilitate in the establishment of communication sessions on behalf of UE 101. In some embodiments, the establishment of communications sessions may be performed in accordance with one or more policies provided by PCF/PCRF 825.

PCF/PCRF 825 may include one or more devices, systems, VNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, etc., that receive, store, and/or provide information that may be used in determining parameters (e.g., quality of service parameters, charging parameters, or the like) for certain applications.

UPF/PGW-U 835 may include one or more devices, systems, VNFs, etc., that receive, store, and/or provide data (e.g., user plane data). For example, UPF/PGW-U 835 may receive user plane data (e.g., voice call traffic, data traffic, etc.), destined for UE 101, from DN 850, and may forward the user plane data toward UE 101 (e.g., via RAN 810, SMF/PGW-C 820, and/or one or more other devices). In some embodiments, multiple UPFs 835 may be deployed (e.g., in different geographical locations), and the delivery of content to UE 101 may be coordinated via the N9 interface (e.g., as denoted in FIG. 8 by the line marked "N9" originating and terminating at UPF/PGW-U 835). Similarly, UPF/PGW-U 835 may receive traffic from UE 101 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

HSS/UDM 840 and AUSF 845 may include one or more devices, systems, VNFs, etc., that manage, update, and/or store, in one or more memory devices associated with AUSF 845 and/or HSS/UDM 840, profile information associated with a subscriber. AUSF 845 and/or HSS/UDM 840 may perform authentication, authorization, and/or accounting operations associated with the subscriber and/or a communication session with UE 101.

DN 850 may include one or more wired and/or wireless networks. For example, DN 850 may include an IP-based PDN, a wide area network ("WAN") such as the Internet, a private enterprise network, and/or one or more other networks. UE 101 may communicate, through DN 850, with data servers, other UEs 101, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 101 may communicate.

CSCF 847 may include one or more devices, systems, VNFs, etc., that gather, process, search, store, and/or provide information in a manner described herein. CSCF 847 may process and/or route messages, calls, etc. to and/or from UE 101 via the EPC. For example, CSCF 847 may process messages or calls, received from an external network, that are destined for UE 101. In another example, CSCF 847 may process messages and/or calls, received from UE 101, that are destined for the external network. CSCF 847 may be part of an IMS network that includes multiple CSCFs 847. While not explicitly shown in FIG. 8, the term "CSCF" may refer to a set of CSCFs, including an Interrogating CSCF ("I-CSCF"), a Serving CSCF ("S-CSCF"), and/or a Proxy CSCF ("P-CSCF").

VNF Selection Component 103 may include one or more devices, systems, VNFs, etc., that perform one or more functions described herein. For example, as discussed above, VNF Selection Component 103 may select particular instances of VNFs (e.g., one or more of the VNFs enumerated above, and/or other VNFs of the wireless network) in response to a request for a VNF from a requestor. Specifically, for example, VNF Selection Component 103 may resolve requests for FQDNs or other identifiers by selecting a particular instance of a VNF that meets the criteria of the request (e.g., has the requested FQDN) based on routing metrics between the instance of the VNF and the requestor, and provides an IP address of the selected VNF in response to the request. VNF Selection Component 103 may, for example, communicate with VNF Repository 105, Route Repository 107, and/or Route Cost Component 109 (e.g., as similarly discussed above) in order to obtain information that may be utilized in this selection process.

VNF Repository 105 may include one or more devices, systems, VNFs, etc., that store information that maps VNF types, FQDNs, or other identifiers, to IP addresses and/or other locators. In some embodiments, VNF Repository 105 may be, or may include, a Network Repository Function ("NRF") associated with the wireless network.

Route Repository 107 include one or more devices, systems, VNFs, etc., that store information associated with routes between various elements of the illustrated network. For example, Route Repository 107 may implement the same dynamic routing technique as one or more other elements of the network (e.g., BGP or some other suitable technique), via which various elements may determine and advertise the routes between themselves and other elements of the networks. Based on these advertisements, Route Repository 107 may maintain some or all of the advertised routes in the network. In some embodiments, Route Repository 107 may be, or may include, a BGP route reflector.

Route Cost Component 109 include one or more devices, systems, VNFs, etc., that score and/or otherwise determine metrics associated with routes between various elements of the illustrated network, including UE 101. For example, Route Cost Component 109 may implement the same dynamic routing technique as one or more other elements of the network (e.g., BGP or some other suitable technique), which may include the functionality to determine score such routes. In some embodiments, Route Cost Component 109 may perform practical tests (e.g., speed tests, latency tests, etc.), and/or may receive results of such practical tests from some other device or system, in order to determine metrics or scores associated with the routes of the network.

In FIG. 8, for the sake of clarity, no connections are shown between VNF Selection Component 103, VNF Repository 105, Route Repository 107, Route Cost Component 109, and other elements of the network. In practice, these devices, systems, or VNFs may be communicatively coupled to some or all of the other elements of the network (e.g., based on the particular routing topology of the network). Furthermore, VNF Selection Component 103, VNF Repository 105, Route Repository 107, and/or Route Cost Component 109 may be communicatively coupled to one or more routing elements (not shown) of the network, such as routers, hubs, switches, etc.

Figure 9:
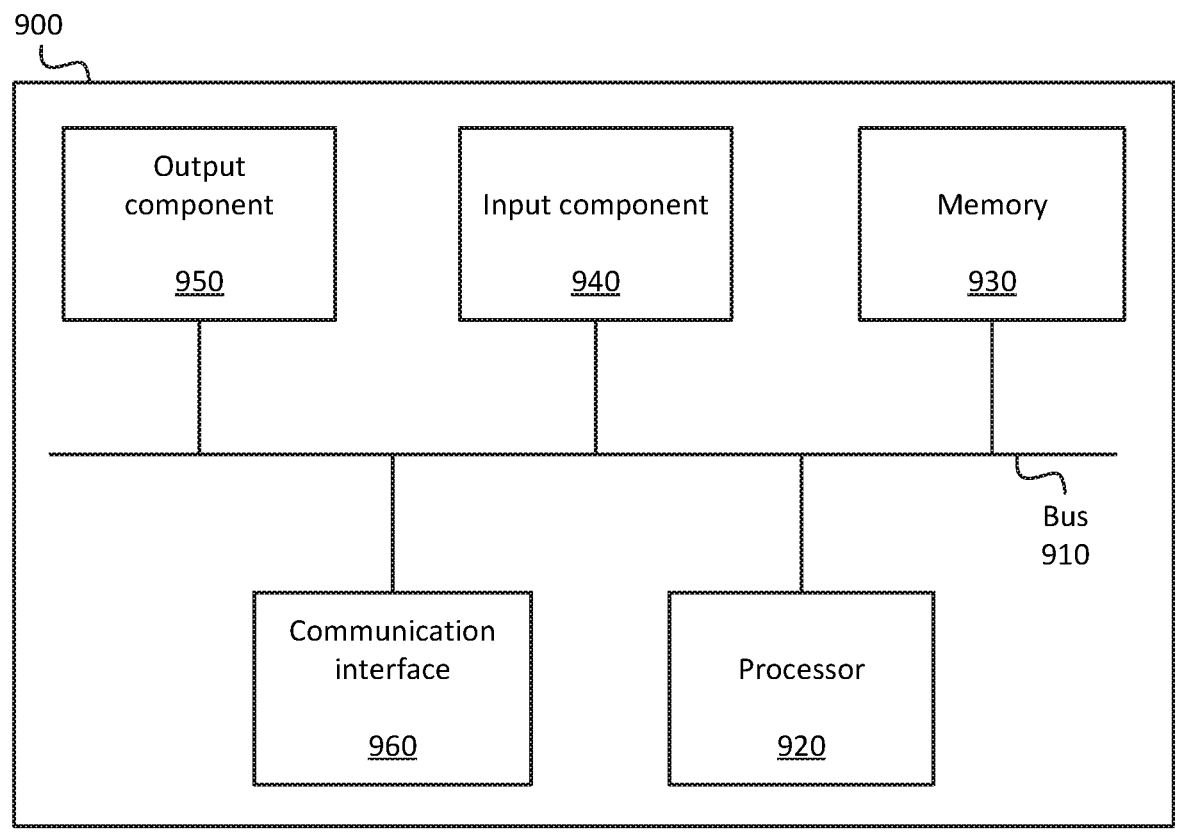
FIG. 9 illustrates example functional components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

As another example, while described in the context of VNFs of a wireless telecommunications network, in practice, similar concepts may apply to other types of devices that utilize IP-based messaging and/or that provide resolution of domain names (e.g., DNS resolution, mapping of FQDNs to IP addresses, etc.). For example, similar concepts may apply to cloud computing systems, edge computing systems (e.g., Mobile/Multi-Access Edge Computing ("MEC") systems), etc. In this manner, DNS requests (or other types of resolving of identifiers or names to IP addresses or other suitable locators) may be resolved in a manner that optimizes metrics of routes between a requestor of an IP address (or other suitable locator) and an entity that is selected, from a pool of suitable entities, in response to the request.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more hardware processors configured to:
   receive information mapping a plurality of instances of a particular Virtualized Network Function ("VNF") of a wireless network to a set of Internet Protocol ("IP") addresses;
   receive, from a requestor, a request for an IP address, wherein the request includes an identifier of the particular VNF;
   identify a respective set of routes between each instance of the plurality of instances of the particular VNF and the requestor;
   determine one or more metrics associated with each route, of the identified sets of routes, between each instance of the particular VNF and the requestor;
   select a particular instance of the particular VNF, from the plurality of instances of the particular VNF, based on the determined one or more metrics;
   determine a particular IP address associated with the particular instance of the particular VNF; and
   output, in response to the request for the IP address based on the identifier of the particular VNF, the determined particular IP address associated with the particular instance of the particular VNF.

2. The device of claim 1, wherein the requestor is a User Equipment ("UE") associated with the wireless network.

3. The device of claim 1, wherein the identifier of the particular VNF is an identifier of a type of the particular VNF, wherein different types of VNFs provide different functionality associated with the wireless network.

4. The device of claim 1, wherein different instances of the same type of VNF provide the same functionality associated with the wireless network.

5. The device of claim 1, wherein the identifier of the particular VNF includes a domain name associated with the particular VNF.

6. The device of claim 1, wherein the one or more metrics associated with each route include a quantity of routing hops included in each route.

7. The device of claim 1, wherein the one or more metrics associated with each route include a measure of performance that has been calculated based on performance tests that have been performed with respect to each route.

8. A non-transitory computer-readable medium, storing a plurality of processor-executable instructions to:
   receive information mapping a plurality of instances of a particular Virtualized Network Function ("VNF") of a wireless network to a set of Internet Protocol ("IP") addresses;
   receive, from a requestor, a request for an IP address, wherein the request includes an identifier of the particular VNF;
   identify a respective set of routes between each instance of the plurality of instances of the particular VNF and the requestor;
   determine one or more metrics associated with each route, of the identified sets of routes, between each instance of the particular VNF and the requestor;
   select a particular instance of the particular VNF, from the plurality of instances of the particular VNF, based on the determined one or more metrics;
   determine a particular IP address associated with the particular instance of the particular VNF; and
   output, in response to the request for the IP address based on the identifier of the particular VNF, the determined particular IP address associated with the particular instance of the particular VNF.

9. The non-transitory computer-readable medium of claim 8, wherein the requestor is a User Equipment ("UE") associated with the wireless network.

10. The non-transitory computer-readable medium of claim 8, wherein the identifier of the particular VNF is an identifier of a type of the particular VNF, wherein different types of VNFs provide different functionality associated with the wireless network.

11. The non-transitory computer-readable medium of claim 8, wherein different instances of the same type of VNF provide the same functionality associated with the wireless network.

12. The non-transitory computer-readable medium of claim 8, wherein the identifier of the particular VNF includes a domain name associated with the particular VNF.

13. The non-transitory computer-readable medium of claim 8, wherein the one or more metrics associated with each route include a quantity of routing hops included in each route.

14. The non-transitory computer-readable medium of claim 8, wherein the one or more metrics associated with each route include a measure of performance that has been calculated based on performance tests that have been performed with respect to each route.

15. A method, comprising:
receiving information mapping a plurality of instances of a particular Virtualized Network Function ("VNF") of a wireless network to a set of Internet Protocol ("IP") addresses;
receiving, from a requestor, a request for an IP address, wherein the request includes an identifier of the particular VNF;
identifying a respective set of routes between each instance of the plurality of instances of the particular VNF and the requestor;
determining one or more metrics associated with each route, of the identified sets of routes, between each instance of the particular VNF and the requestor;
selecting a particular instance of the particular VNF, from the plurality of instances of the particular VNF, based on the determined one or more metrics;
determining a particular IP address associated with the particular instance of the particular VNF; and
outputting, in response to the request for the IP address based on the identifier of the particular VNF, the determined particular IP address associated with the particular instance of the particular VNF.

16. The method of claim 15, wherein the requestor is a User Equipment ("UE") associated with the wireless network.

17. The method of claim 15, wherein the identifier of the particular VNF is an identifier of a type of the particular VNF, wherein different types of VNFs provide different functionality associated with the wireless network, and wherein different instances of the same type of VNF provide the same functionality associated with the wireless network.

18. The method of claim 15, wherein the identifier of the particular VNF includes a domain name associated with the particular VNF.

19. The method of claim 15, wherein the one or more metrics associated with each route include a quantity of routing hops included in each route.

20. The method of claim 15, wherein the one or more metrics associated with each route include a measure of performance that has been calculated based on performance tests that have been performed with respect to each route.

* * * * *